(No Model.)  3 Sheets—Sheet 1.
M. KANE.
HARVESTER GEARING.
No. 466,740.  Patented Jan. 5, 1892.
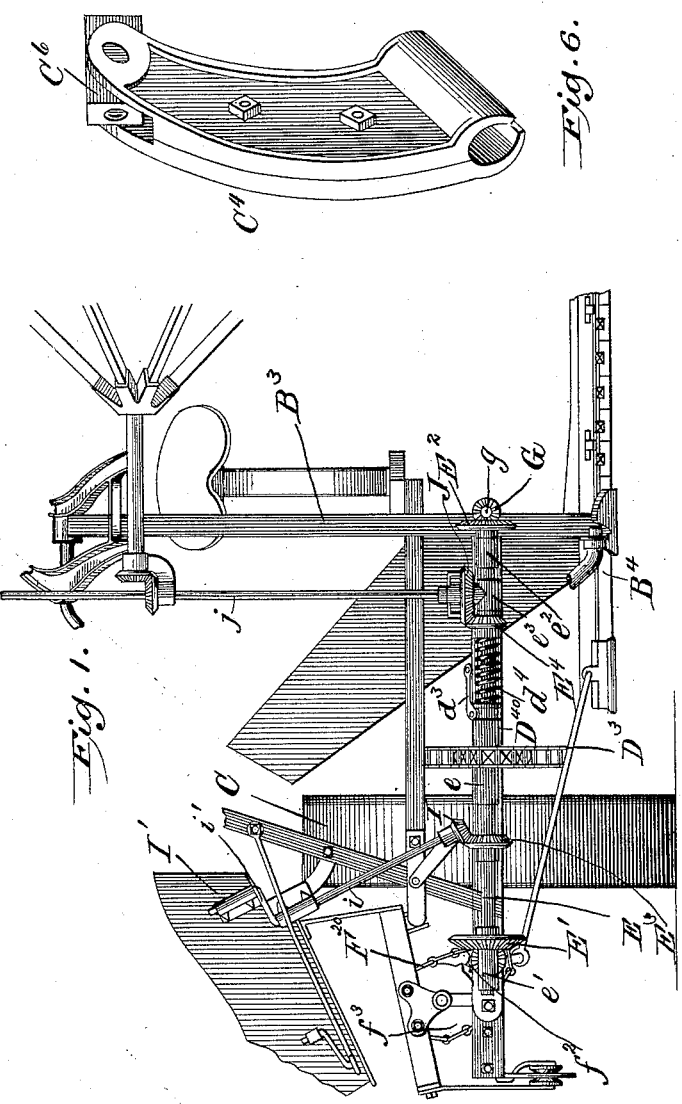
Witnesses:
Arthur Ashley
Julia Usler.
Inventor:
Maurice Kane
By Burton and Burton
His Attys.

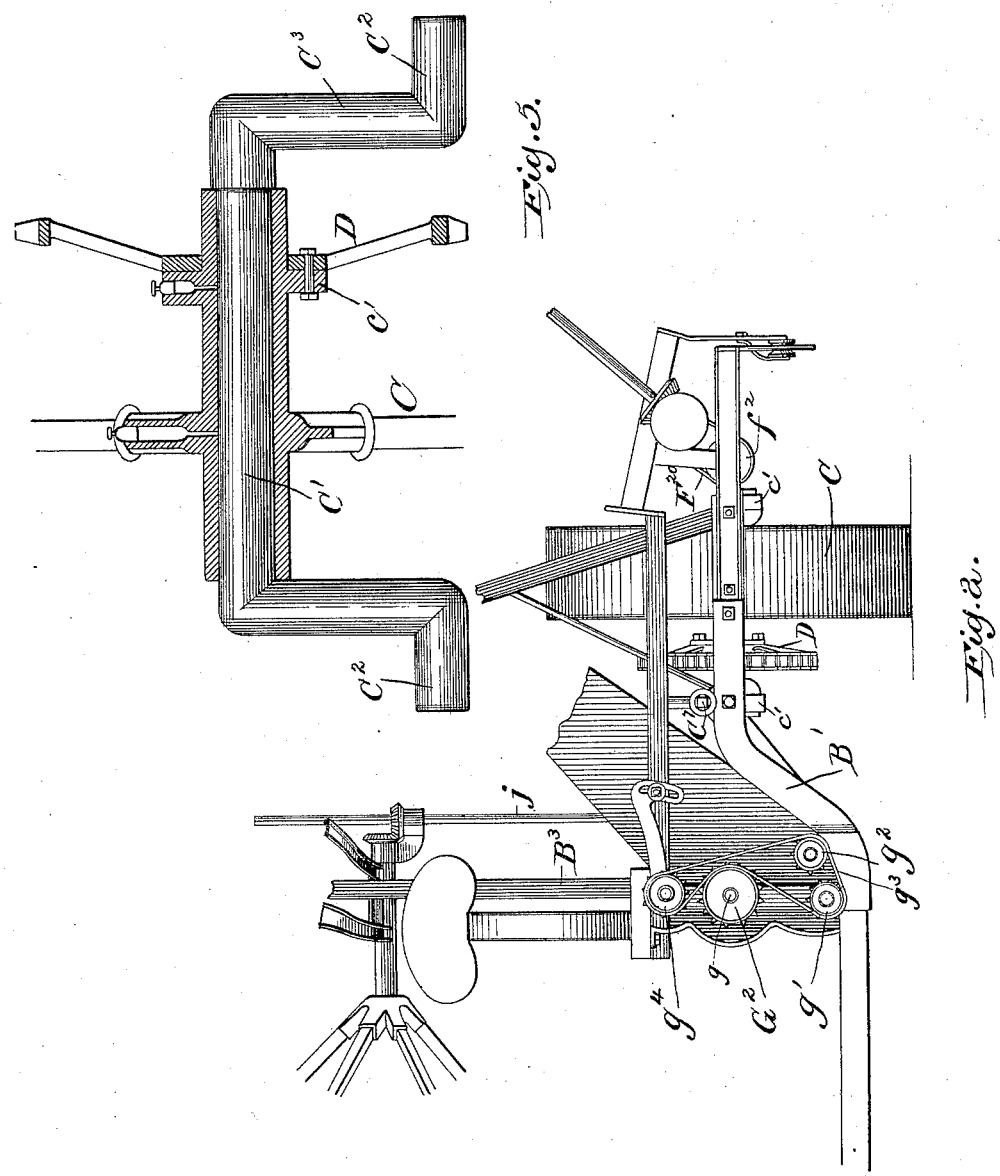

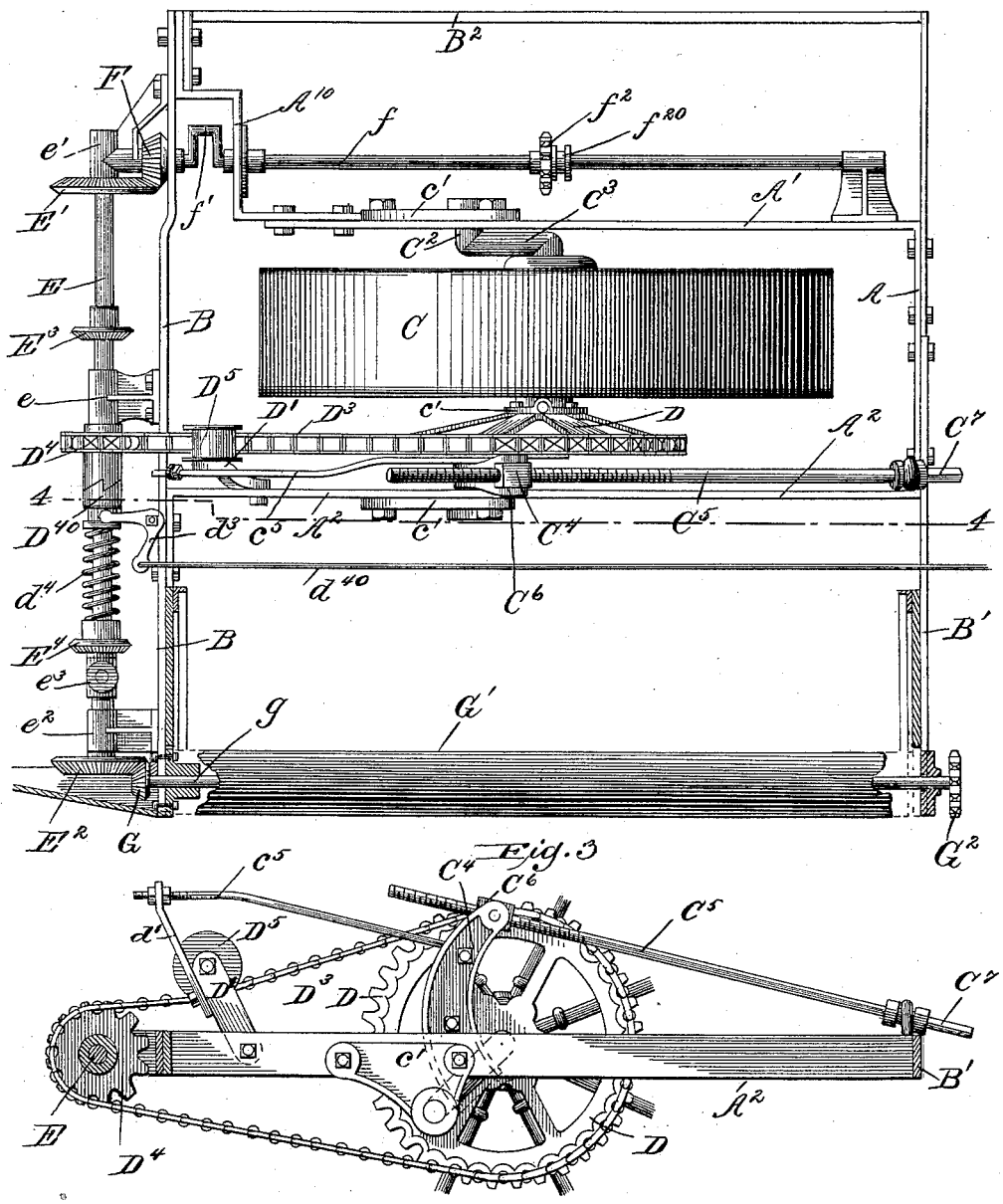

UNITED STATES PATENT OFFICE.

MAURICE KANE, OF CHICAGO, ILLINOIS, ASSIGNOR TO THE WARDER, BUSHNELL & GLESSNER COMPANY, OF SPRINGFIELD, OHIO.

HARVESTER-GEARING.

SPECIFICATION forming part of Letters Patent No. 466,740, dated January 5, 1892.

Application filed June 8, 1891. Serial No. 395,572. (No model.)

*To all whom it may concern:*

Be it known that I, MAURICE KANE, a citizen of the United States, residing at Chicago, county of Cook, and State of Illinois, have invented certain new and useful Improvements in Harvester-Gearings, which are fully set forth in the following specification, reference being had to the accompanying drawings, forming a part thereof.

The purpose of this invention is to provide a construction of frame and gearing for a self-binding harvester in which motion shall be communicated to the several mechanisms which are mounted on the frame in a more direct manner than heretofore from a single horizontal shaft at the forward side of the machine; and the invention consists in the details of construction specified in the claims relating to such driving-train.

In the drawings, Figure 1 is a front side elevation of the frame and gearing-train and sufficient parts of the several mechanisms to show the transmission of power from the main gearing-train to them, respectively. Fig. 2 is a rear side elevation of the same. Fig. 3 is a partly-sectional plan of the main frame and gearing-train, the other mechanisms mounted on the frame being removed except the main driving-roller of the elevator, which is shown. Fig. 4 is a detail section at the line 4 4 on Fig. 3, omitting the drive-wheel. Fig. 5 is a sectional detail showing the main axle and its connection with the main frame, the drive-wheel and main power-wheel being each shown in axial section. Fig. 6 is an enlarged detail of the lever-arm.

The main frame comprises the several bars and sills which inclose the drive-wheel and support the other mechanisms, being rigidly framed together. As illustrated, it comprises the wheel-yoke A, which extends at the rear of the wheel and has its arms A' A² bent parallel, extending fore and aft on opposite sides of the wheel. The arm A² at its forward end is bent grainward to afford fastening for the front sill, and the arm A' at its forward end has secured to it an extension-piece A¹⁰, which is bent in zigzag form—that is, has first a bend stubbleward, then a bend forward, and finally a bend stubbleward to afford fastening to the front sill, the double bend in this part A¹⁰ being made to accommodote the sickle-driving crank, as will be hereinafter pointed out.

B is the front sill, to which the forward ends of the fore and aft bars described are fastened, as stated.

B' is the rear sill, to which the middle portion of the wheel-yoke A is made fast.

B² is the stubbleward-bar of the frame. The rear sill B is deflected downward at a plane grainward of the plane of the arm A² of the wheel-yoke, and then again extended horizontally to form the rear sill of the platform. To the front sill the upright post B³ is secured, extending upward to support the reel and downward to afford support for the front sili B⁴ of the platform.

C is a drive-wheel. Its axle is the crank rock-shaft C', whose wrists C² are suitably journaled on the opposite arms A' and A² of the wheel-yoke, brackets c' being secured to said arms for that purpose.

C⁴ is a lever-arm of special construction, which is bolted onto one of the cranks C³ of the cranked rock-shaft C' and serves as a means for rocking the shaft to raise and lower the main frame, as hereinafter described.

Rigid with the drive-wheel C is the main power-wheel D, which, as illustrated, though not necessarily for the purpose of this invention, is adapted to be made rigid with said wheel by being formed without a hub and being adapted to pass onto the hub of the drive-wheel, which is provided with a flange c' for bolting the power-wheel D to the drive-wheel.

E is the main power-shaft. It extends horizontally transversely to the plane of the travel of the drive-wheel forward of the front sill B, by which it is supported by means of suitable bracket journal-boxes e, e', and e², made fast to said front sill at the forward side thereof. This shaft E extends to the right and left of the vertical plane of the drive-wheel, and at its opposite ends there are secured to it the oppositely-beveled gears E' and E² for driving, respectively, the binder and the elevator and by means of the elevator-shaft the other conveying mechanism at the grain side of the drive-wheel.

$f$ is a shaft extending fore and aft at the stubbleward side of the drive-wheel, having suitable journal-bearings on the main frame, and having at its forward end the driving-pinion F, which meshes with the beveled gear E' on the shaft E, whereby power is transmitted from the shaft E to the shaft $f$.

$f^2$ is a sprocket-wheel feathered and adapted to slide on the shaft $f$ and having its hub provided with the annular groove $f^{20}$ to afford facility for sliding it back and forward on the shaft in a manner which will be understood without description. This sprocket-wheel, by means of the chain $F^{20}$, which passes over it, communicates power to the binder, which is partly or conventionally represented in Figs. 1 and 2, where said chain is shown driving the main binder-wheel $f^3$.

$g$ is a shaft extending fore and aft at the grainward side of the drive-wheel and at considerable distance therefrom, suitably journaled at its front and rear ends on the main frame, and having intermediate its bearings the roller G', which is the elevator-driving roller. At its forward end this shaft has the beveled pinion G, which meshes with and is driven by the beveled gear-wheel $E^2$ on the shaft E, whereby said shaft E communicates power to drive the elevator. At the rear end of the shaft $g$ it carries rigid with it the sprocket-wheel $G^2$ and the chain $g^3$, which passes over the sprocket-wheels $g^4$, $g'$, and $g^2$, is deflected partly about the wheel $G^2$, and is thereby engaged with said sprocket-wheels, so that said wheel communicates power to the sprocket-wheels $g'$ and $g^2$, which are secured, respectively to and drive the platform-conveyer-driving roller and the driving-roller of the lower elevator-apron. Thus, the beveled gear $E^2$ on the shaft E communicates power to drive all the conveying and elevating mechanism at the grainward side of the drive-wheel, while the gear E' on the same shaft communicates power to drive the binding mechanism at the stubbleward side of the drive-wheel. Power is communicated to the shaft E by the chain $D^3$, which passes from the main power-wheel D to the sprocket-wheel $D^4$ on the shaft E intermediate its ends and immediately adjacent to the bearing $e$. The hub of this sprocket-wheel forms one member of the clutch, the other member being represented at $D^{40}$, the spring $d^4$, reacting against the hub of the wheel $E^4$, which will will be hereinafter described, serving to hold the clutch in engagement, the lever $d^3$, actuated by the rod $d^{40}$, serving to disengage the clutch in a familiar manner.

$E^4$ is a beveled gear-wheel rigid with the shaft E, which serves to drive the reel. It is beveled on the same side as the gear $E^2$—that is, is oppositely from the gear E'. A yoke $e^3$ on the shaft E, adjacent to said beveled gear-wheel, has a bearing for the reel-driving shaft $j$, which carries at its lower end the beveled gear J, which meshes with the beveled gear $E^4$ and receives power therefrom.

The particular construction of the reel mechanism is not involved in this invention and need not be further described.

$E^3$ is a beveled gear fixed on the shaft E stubbleward from the sprocket-wheel $D^4$. It is beveled on the same side as the gear $E^2$, oppositely from the gear E'. It meshes with the beveled pinion I, which is fixed on the lower end of the shaft $i$, which extends upward with rearward inclination, and has at its upper end the crank $i'$, on the wrist of which is carried the butter I', pertaining to the binder.

Summarizing this construction, it will be observed that from a single shaft E power is taken, first, to two fore-and-aft shafts at the extremities of the train and on opposite sides of the drive-wheel for the purpose of driving the extreme grainward and the extreme stubbleward parts of the mechanism, respectively, and that power is again taken at two points at opposite sides of the plane of the power-wheel by means of the gears $E^3$ and $E^4$ for the butter and reel, respectively. It should now be further noticed that the shaft $f$, which drives the binder, is cranked just rearward of its bearing in the front sill, and that said crank $f'$ drives the sickle, and that on account of the especial strain upon the shaft caused by this connection it is provided with an additional bearing just rearward from said crank by means of the zigzag extension $A^{10}$ of fore-and-aft arm A of the wheel-yoke. By this means the driving connection for the sickle is located as far as possible from the end of the sickle, making the action as easy as possible and making it possible to operate it from a shaft considerably higher than its plane of reciprocation and dispensing with intervening mechanism which would be necessary to actuate the crank-shaft at the same level as the sickle.

The power required to drive the sickle and the binder, which is derived through the beveled gear E', is about equal to the power required for all the remainder of the mechanisms—viz., the elevator, platform-conveyer, reel, and butter. Since all these mechanisms derive motion from the shaft E, which carries the bevel-gear E', and derive that power through bevel-gears on said shaft, it is of some importance that the reaction endwise on said shaft from all said mechanisms should be divided as equally as possible, half being experienced in one direction and half in the opposite direction, and thereby, as nearly as may be, made to counterbalance each other and leave the shaft without any endwise tendency or thrust against its bearings, and this is accomplished by making the gears $E^2$, $E^3$, and $E^4$ beveled oppositely to the gear E'.

An important advantage arising from locating the main power-shaft on the front of the machine and deriving directly from it the power for the several mechanisms is that, since the sickle, reel, and the butter must be driven from the front, by locating the power-shaft at the front it becomes unnecessary to gear back and forth across the machine, as is necessary if the power-shaft is at the rear. The mechanism is thus reduced and the power necessary to drive it correspondingly reduced.

The machine is raised and lowered, as stated before, by rocking the rock-shaft $C'$ in the hub of the drive-wheel to carry the wrists $C^2$ $C^2$ up and down, and thereby to carry the main frame on said wrists up and down. The rocking of the rock-shaft is effected by means of the lever-arm $C^4$, secured to the crank $C^3$. This lever-arm is made of two pieces adapted to be bolted together and clamped thereby onto the crank $C^3$. The upper end of the arm is bifurcated to admit the screw-block $C^6$, pivoted in the notch or crotch of said arm and adapted to rock in a vertical plane about its pivot, the screw-shaft $C^5$, having a bearing at the rear sill, being screwed through said block and provided with a squared end $C^7$ at its rear end, to which a wrench or crank may be applied to rotate it.

The action of this device to rock the shaft $C'$ and thereby raise and lower the main frame is obvious; but it will also be obvious that in such adjustment the distance of the main power-wheel D from the sprocket-wheel $D^4$ on the shaft E will be altered, and in order to provide for taking up the slack, or, in other words, to provide for slack which may be yielded as required in such adjustment, I provide the tightener-pulley $D^5$ on the lever-arm $D'$, which is pivoted to the grainward arm $A^2$ of the wheel-yoke, adjacent to which is the plane of the chain $D^3$, and I connect the upper end of said lever-arm by the link $c^5$ with the lever-arm $C^4$. It will be obvious that as the lever-arm $C^4$ is rocked in a vertical plane the position of the tightener-pulley $D^5$ with respect to the chain will be altered, and that the several parts may be so proportioned that such change of relative position will correspond, substantially, to the tightening or the slackening of the chain, so that the tightening-pulley will keep the chain practically taut at all positions.

In order to provide in the same device for adjustment to compensate for the wear of the chain and sprocket-wheels, the link $c^5$ may have a threaded connection with the lever $d'$, so that, independently of the rocking of the arm $C^4$, the tightener may be adjusted to take up the slack of the chain.

I claim—

1. In a harvester having an elevator substantially abreast of the drive-wheel at the grainward side, the drive-wheel and the main frame supported thereby, the main power-shaft E, located on the main frame and extending transversely to the direction of travel in front of the drive-wheel, and a shaft on the frame, located stubbleward of the drive-wheel and actuated by direct connection with the main power-shaft, combined with the fore-and-aft shaft $g$, journaled on the main frame and arranged to drive the elevator, and the beveled gears on said shafts E and $g$, respectively, whereby the former drives the latter, substantially as set forth.

2. In a harvester, the drive-wheel and the main frame supported thereby, and the main power-shaft E, extending horizontally across the direction of travel in front of the drive-wheel, combined with the horizontal fore-and-aft shafts $f$ and $g$, journaled on the main frame and located, respectively, stubbleward and grainward of the drive-wheel, parallel thereto, and arranged, respectively, to drive the binder at the stubble side, and the mechanisms which bring the grain to the binder at the grain side of the drive-wheel, substantially as set forth.

3. In a harvester, in combination with the drive-wheel and the main frame supported thereby, the power-communicating wheel rigid with the drive-wheel, and the main power-shaft E, extending horizontally across the direction of travel in front of the drive-wheel, and the drive-chain by which the former drives the latter without endwise thrust, the gears $E'$ and $E^2$ on said shaft, oppositely beveled, and the binder and sickle driving shaft arranged to be driven by one of said gears, and the elevator and conveyer driving shaft arranged to be driven by the other, said shafts being located at opposite sides of the drive-wheel, substantially as set forth.

4. In a harvester, the drive-wheel and the main frame supported thereby, the power-communicating wheel, and the main power-shaft E, extending horizontally across the direction of travel in front of the drive-wheel, and the drive-chain by which the former drives the latter without endwise thrust, combined with bevel-gears on said main shaft arranged to drive, respectively, the various mechanisms of the harvester, the gear-wheel which drives the sickle and binder being beveled oppositely to all the others, substantially as and for the purpose set forth.

5. In a harvester, the drive-wheel and the main frame supported thereby, and the main power-shaft E, extending horizontally across the direction of travel in front of the drive-wheel, combined with an upwardly-extending shaft at the forward side of the machine, beveled gears on said shafts, respectively, by which the former drives the latter, said upwardly-extending shaft being provided with a crank at its upper part, and the butter connected to and operated by such crank, substantially as set forth.

In testimony whereof I have hereunto set my hand, at Chicago, Illinois, in the presence of two witnesses, this 26th day of May, A. D. 1891.

MAURICE KANE.

Witnesses:
JEAN ELLIOTT.
JULIA USLER.